United States Patent
Tokushima

(10) Patent No.: US 10,139,251 B2
(45) Date of Patent: Nov. 27, 2018

(54) POWER TRANSMITTING APPARATUS, ROBOT, AND PRINTER

(71) Applicant: Seiko Epson Corporation, Tokyo (JP)

(72) Inventor: Daiki Tokushima, Azumino (JP)

(73) Assignee: Seiko Epson Corporation (JP)

(*) Notice: Subject to any disclaimer, the term of this patent is extended or adjusted under 35 U.S.C. 154(b) by 0 days.

(21) Appl. No.: 15/655,107

(22) Filed: Jul. 20, 2017

(65) Prior Publication Data
US 2018/0031394 A1   Feb. 1, 2018

(30) Foreign Application Priority Data

Jul. 27, 2016  (JP) ................. 2016-147732

(51) Int. Cl.
| | |
|---|---|
| *G01D 5/34* | (2006.01) |
| *G01D 5/347* | (2006.01) |
| *G05B 19/414* | (2006.01) |
| *H02P 5/46* | (2006.01) |

(52) U.S. Cl.
CPC .............. *G01D 5/345* (2013.01); *G01D 5/34* (2013.01); *G01D 5/3473* (2013.01); *G01D 5/34715* (2013.01); *G05B 19/414* (2013.01); *H02P 5/46* (2013.01)

(58) Field of Classification Search
CPC ........ G01D 5/345; G01D 5/34; G01D 5/3473; G05B 19/414
See application file for complete search history.

(56) References Cited

U.S. PATENT DOCUMENTS

| | | | | |
|---|---|---|---|---|
| 3,306,159 A | * | 2/1967 | Beall, Jr. ................ | G01D 5/345 250/225 |
| 4,958,072 A | * | 9/1990 | Hofler .................... | G01C 17/26 250/225 |
| 5,389,780 A | * | 2/1995 | Anderson ................ | G01L 3/12 250/225 |
| 2006/0192517 A1 | | 8/2006 | Miyashita et al. | |
| 2011/0069390 A1 | * | 3/2011 | Yoshida ............... | G01D 5/3473 359/573 |

(Continued)

FOREIGN PATENT DOCUMENTS

| | | |
|---|---|---|
| JP | 04-123205 A | 4/1992 |
| JP | 2006-271189 A | 10/2006 |
| WO | WO-2013-065737 A1 | 5/2013 |

*Primary Examiner* — Roy M Punnoose
(74) *Attorney, Agent, or Firm* — Harness, Dickey & Pierce, P.L.C.

(57) ABSTRACT

A power transmitting apparatus includes a power transmitting section that includes an input shaft section and an output shaft section and transmits drive force from the input shaft section to the output shaft section, a first detection section including a polarizing section that rotates when one of the input shaft section and the output shaft section rotates and has a polarization characteristic, a light source section that irradiates the polarizing section with light, and a light detection section that outputs a signal according to the intensity of the light from the polarizing section, a second detection section that outputs a signal according to the rotational state of the other one of the input shaft section and the output shaft section, and a determination section that determines the rotational state of the polarizing section based on the signal from the light detection section and the signal from the second detection section.

9 Claims, 10 Drawing Sheets

(56) References Cited

U.S. PATENT DOCUMENTS

2013/0110128 A1* 5/2013 Schostek ............ A61B 1/00158
606/130
2014/0306099 A1 10/2014 Oguchi et al.

* cited by examiner

POWER TRANSMITTING APPARATUS, ROBOT, AND PRINTER

BACKGROUND

1. Technical Field

The present invention relates to a power transmitting apparatus, a robot, and a printer.

2. Related Art

As one kind of encoder, an optical rotary encoder is typically known (see WO 2013/065737, for example). A rotary encoder is used, for example, in a robot including a robot arm having a pivotable joint and detects the rotational angle, the rotational position, the number of revolutions, the rotational speed, and other rotational states of the joint.

For example, the encoder unit described in WO 2013/065737 includes an optical scale and an optical sensor package. The optical scale has a polarizer that rotates around the center thereof and a light blocking pattern and a light transmitting pattern so separately arranged in in-plane 180-degree areas with respect to the center of the polarizer as to surround the outer circumference of the polarizer. The optical sensor package includes two optical sensors that are 180° symmetrically positioned with respect to the center of the polarizer and face the polarizer and an optical sensor that is disposed in a position outside the two optical sensors and detects light from the light blocking pattern.

In the encoder unit described in WO 2013/065737, only a result of the detection performed by the two optical sensors, which detect light through the polarizer, does not allow distinction between a state in which the polarizer has rotated by 180° and a state in which the polarizer has not . The encoder unit described in WO 2013/065737 therefore distinguishes the state in which the polarizer has rotated by 180° from the state in which the polarizer has not by evaluating whether or not the outside optical sensor has detected light from the light blocking pattern.

In the encoder unit described in WO 2013/065737, however, the optical scale needs to be provided with the light blocking pattern and the light transmitting pattern in addition to the polarizer, undesirably resulting in an increase in the size of the optical scale.

SUMMARY

An advantage of some aspects of the invention is to provide a power transmitting apparatus capable of distinction between two 180-degree different states of a polarizing section with the size of an optical scale reduced and further provide a robot and a printer including the power transmitting apparatus.

The advantage described above can be achieved by the following configurations.

A power transmitting apparatus according to an aspect of the invention includes a power transmitting section that includes an input shaft section and an output shaft section and transmits drive force from the input shaft section to the output shaft section, a first detection section including a polarizing section that rotates when one of the input shaft section and the output shaft section rotates and has a polarization characteristic, a light source section that irradiates the polarizing section with light, and a light detection section that outputs a signal according to intensity of the light from the polarizing section, a second detection section that outputs a signal according to a rotational state of another one of the input shaft section and the output shaft section, and a determination section that determines a rotational state of the polarizing section based on the signal from the light detection section and the signal from the second detection section.

According to the power transmitting apparatus, two states of the polarizing section that differ from each other by 180° can be distinguished from each other without providing a determination pattern on an optical scale including the polarizing section.

In the power transmitting apparatus according to the aspect of the invention, it is preferable that the power transmitting section is a gear apparatus that decelerates drive force inputted to the input shaft section and outputs the decelerated drive force to the output shaft section, that the polarizing section rotates when the output shaft section rotates, that the second detection section outputs a signal according to the rotational state of the input shaft section, and that the determination section uses a quotient of $2r/\alpha$ to distinguish rotational states of the polarizing section that differ from each other by 180° from each other, where $\alpha$ represents a speed transmission ratio of a speed of the input shaft section of the gear apparatus to a speed of the output shaft section thereof, and r represents a number of revolutions of the input shaft section.

Therefore, in the case where drive force inputted to the input shaft section is decelerated and the decelerated drive force is outputted to the output shaft section, two states of the polarizing section that differ from each other by 180° can be distinguished from each other even when the numbers of revolutions of the input shaft section and the output shaft section differ from each other.

In the power transmitting apparatus according to the aspect of the invention, it is preferable that the determination section uses both the quotient and a remainder of $2r/\alpha$ to distinguish the rotational states of the polarizing section that differ from each other by 180° from each other.

The two states of polarizing section that differ from each other by 180° can therefore be accurately distinguished from each other.

In the power transmitting apparatus according to the aspect of the invention, it is preferable that the second detection section is a counter that detects the number of revolutions of the input shaft section.

The second detection section can therefore output a signal according to the number of revolutions of the input shaft section.

In the power transmitting apparatus according to the aspect of the invention, it is preferable that the counter is a multiple rotation detecting encoder.

The second detection section can therefore output a signal according to the number of revolutions and rotational angle of the input shaft section.

It is preferable that the power transmitting apparatus according to the aspect of the invention further includes a motor connected to the input shaft section, and that the multiple rotation detecting encoder is disposed on the motor.

The size of the entire power transmitting apparatus can therefore be reduced. Further, the power transmitting apparatus can be readily installed.

A robot according to another aspect of the invention includes the power transmitting apparatus according to the aspect of the invention.

The thus configured robot, in which the optical scale including the polarizing section is compact, can be designed with increased flexibility.

It is preferable that the robot according to the aspect of the invention further includes an arm having a surface on which the polarizing section is provided.

With this configuration, in the robot including an arm, the polarizing section can be provided by effective use of a surface of the arm. No member for providing the polarizing section is therefore separately required. As a result, the number of parts can be reduced.

A printer according to another aspect of the invention includes the power transmitting apparatus according to the aspect of the invention.

The thus configured printer, in which the optical scale including the polarizing section is compact, can be designed with increased flexibility.

BRIEF DESCRIPTION OF THE DRAWINGS

The invention will be described with reference to the accompanying drawings, wherein like numbers reference like elements.

DESCRIPTION OF EXEMPLARY EMBODIMENTS

A power transmitting apparatus, a robot, and a printer according to preferable embodiments of the invention will be described below in detail with reference to the accompanying drawings.

1. Robot

A robot including a power transmitting apparatus according to an embodiment of the invention (the robot according to an embodiment of the invention) will first be described.

Figure 1:
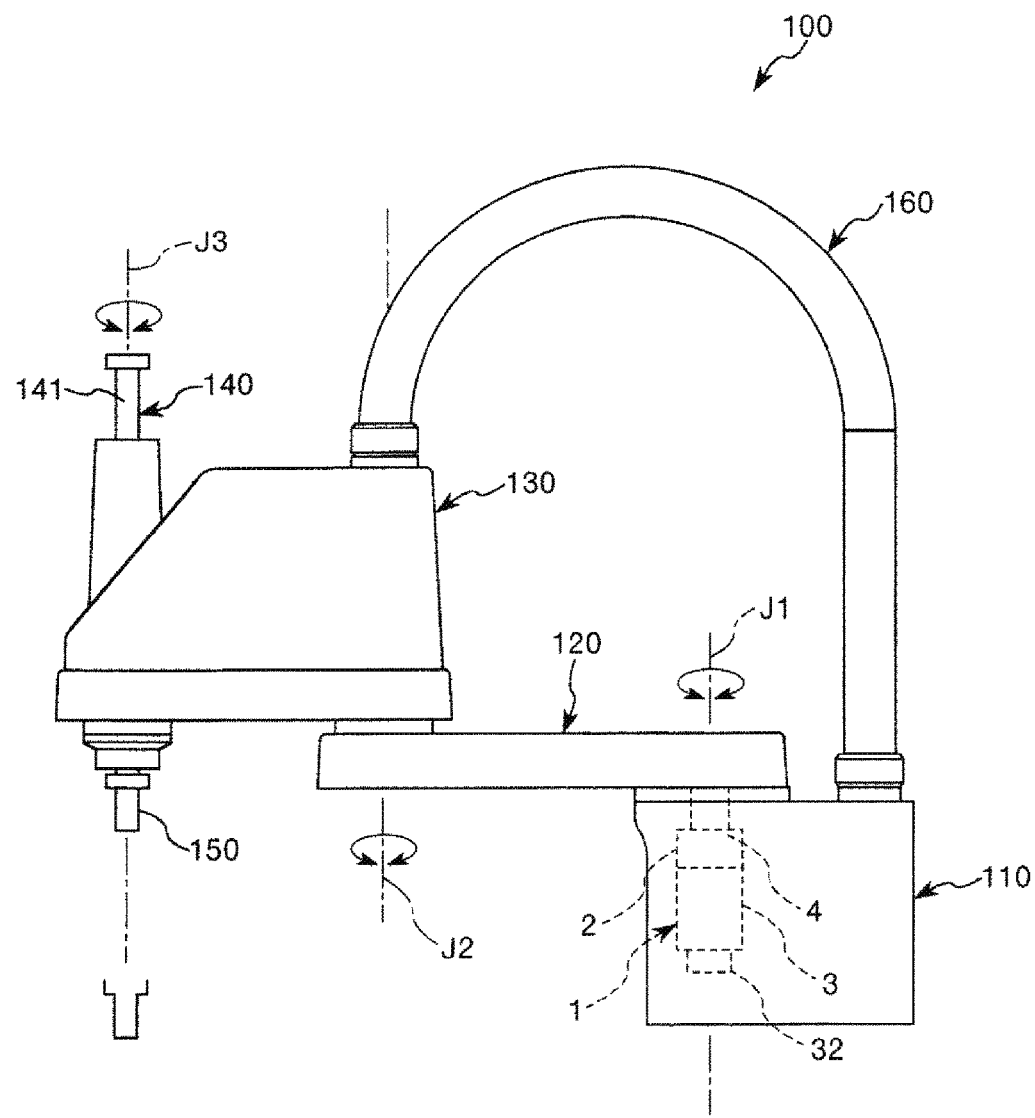
FIG. 1 is a side view showing an example of a robot according to an embodiment of the invention.

FIG. 1 is a side view showing an example of the robot according to the embodiment of the invention. In the following description, the upward side in FIG. 1 is called "upward," and the downward side in FIG. 1 is called "downward" for ease of description. Further, the side facing a base in FIG. 1 is called a "basal end," and the side opposite the base end (end effector side) is called a "distal end." The upward/downward direction in FIG. 1 is called a "vertical direction," and the rightward/leftward direction in FIG. 1 is called a "horizontal direction."

A robot 100 shown in FIG. 1 is what is called a horizontal multi-articulated robot (SCARA robot), is used, for example, in a manufacturing step of manufacturing a precision instrument or any other instrument, and can grasp, transport, and otherwise manipulate the precision apparatus, parts, and other objects.

The robot 100 includes a base 110, a first arm 120, a second arm 130, a work head 140, an end effector 150, and a wiring router 160, as shown in FIG. 1. Each portion of the robot 100 will be sequentially and briefly described below.

The base 110 is fixed, for example, to a floor surface that is not shown with bolts or any other fasteners. The first arm 120 is joined to an upper end portion of the base 110. The first arm 120 is pivotable relative to the base 110 around a pivotal axis J1, which is a first axis along the vertical direction.

A motor unit 3, which includes a first motor that produces drive force that causes the first arm 120 to pivot, and a gear apparatus 2 (power transmitting section), which is a first decelerator that decelerates the drive force produced by the motor unit 3, are disposed in the base 110. The input shaft of the gear apparatus 2 is joined to the rotating shaft of the motor unit 3, and the output shaft of the gear apparatus 2 is joined to the first arm 120. Therefore, when the motor unit 3 is driven and the drive force therefrom is transmitted to the first arm 120 via the gear apparatus 2, the first arm 120 pivots in a horizontal plane around the pivotal axis J1 relative to the base 110. The base 110 and the first arm 120 are provided with a first detection section 4, which is a first encoder that detects the rotational state (pivotal state) of the first arm 120 relative to the base 110. The motor unit 3 includes a second detection section 32, which detects the rotational state of the motor unit 3. The gear apparatus 2, the motor unit 3 (including second detection section 32), and the first detection section 4 form a power transmitting apparatus 1. The power transmitting apparatus 1 will be described later in detail.

The second arm 130 is joined to a distal end portion of the first arm 120. The second arm 130 is pivotable relative to the first arm 120 around a second axis J2 along the vertical direction. Although not shown, a second motor that produces drive force that causes the second arm 130 to pivot and a second decelerator that decelerates the drive force produced by the second motor are disposed in the second arm 130. When the drive force from the second motor is transmitted to the second arm 130 via the second decelerator, the second arm 130 pivots in a horizontal plane around the second axis J2 relative to the first arm 120. Although not shown, the second motor is provided with a second encoder that detects the rotational state of the second arm 130 relative to the first arm 120.

The work head 140 is disposed at a distal end portion of the second arm 130. The work head 140 includes a spline shaft 141, which is inserted through a spline nut and a ball screw nut (neither of them is shown) disposed coaxially with each other in the distal end portion of the second arm 130. The spline shaft 141 is rotatable around an axis J3 thereof relative to the second arm 130 and movable (ascendable and descendable) in the upward/downward direction.

Although not shown, a rotary motor and an ascent/descent motor are disposed in the second arm 130. The drive force from the rotary motor is transmitted to the spline nut via a drive force transmission mechanism that is not shown, and when the spline nut rotates in the forward direction or the reverse direction, the spline shaft 141 rotates in the forward direction or the reverse direction around the axis J3 along the vertical direction. Although not shown, the rotary motor is provided with a third encoder that detects the rotational state of the spline shaft 141 relative to the second arm 130.

On the other hand, the drive force from the ascent/descent motor is transmitted to the ball screw nut via a drive force transmission mechanism that is not shown, and when the ball screw nut rotates in the forward direction or the reverse direction, the spline shaft 141 moves upward or downward. The ascent/descent motor is provided with a fourth encoder that detects the travel of the spline shaft 141 relative to the second arm 130.

The end effector 150 is joined to a distal end portion (lower end portion) of the spline shaft 141. The end effector 150 is not limited to a specific one and may, for example, be a gripper that grips an object to be transported or a processor that processes an object to be processed.

A plurality of wiring lines connected to the electronic parts (second motor, rotary motor, ascent/descent motor, second to fourth encoders, for example) disposed in the second arm 130 are routed through the wiring router 160, which has a tubular shape and joins the second arm 130 to the base 110, into the base 110. Further, the plurality of wiring lines are bundled together in the base 110 and routed, along with wiring lines connected to the motor unit 3 and the first detection section 4, to a controller that is not shown but is disposed in a position outside the base 110 and integrally controls the robot 100.

The robot 100 described above includes the power transmitting apparatus 1 formed of the gear apparatus 2 (power transmitting section), the motor unit 3 (including second detection section 32), and the first detection section 4, as described above. The first detection section 4 provided in the power transmitting apparatus 1 is an optical encoder using an optical scale including a polarizing section, but the power transmitting apparatus 1 has a configuration described below in detail, which allows reduction in size of the optical scale. As a result, the robot 100 can be designed with increased flexibility.

2. Power Transmitting Apparatus

First Embodiment

Figure 2:
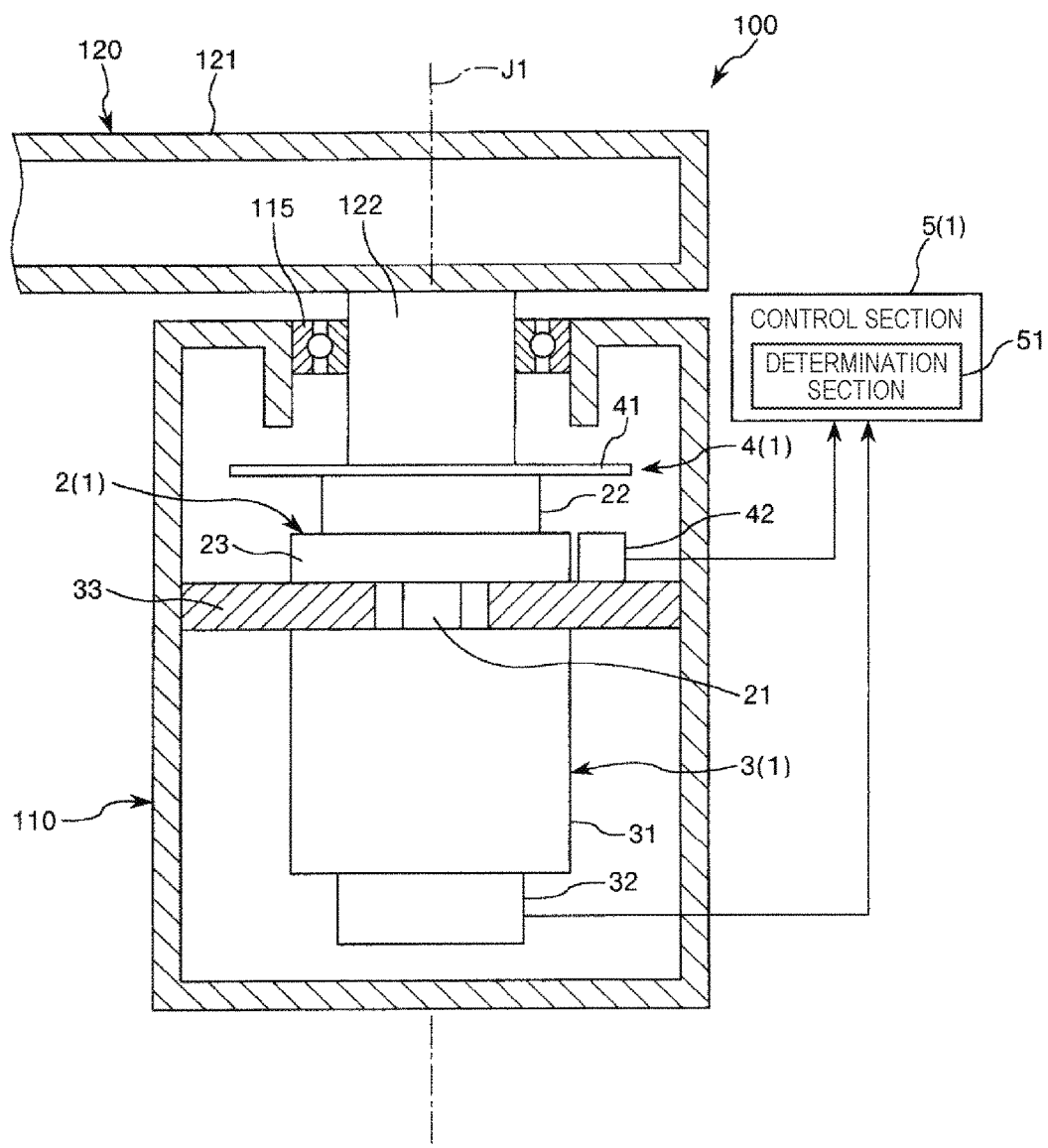
FIG. 2 is a cross-sectional view for describing a power transmitting apparatus according to a first embodiment of the invention.

FIG. 2 is a cross-sectional view for describing a power transmitting apparatus according to a first embodiment of the invention.

The power transmitting apparatus 1 includes the gear apparatus 2, the motor unit 3, which is provided on the side facing the input shaft of the gear apparatus 2, the first detection section 4, which is provided on the side facing the output shaft of the gear apparatus 2, and a control section 5, which is electrically connected to the motor unit 3 and the first detection section 4, as shown in FIG. 2.

The gear apparatus 2 is the "power transmitting section" that includes an input shaft section 21, which is an input shaft, and an output shaft section 22, which is an output shaft, and transmits drive force from the input shaft section 21 to the output shaft section 22. The gear apparatus 2 is a "decelerator" configured as follows: The input shaft section 21 and the output shaft section 22 are so provided as to be rotatable relative to a body section 23; drive force inputted to the input shaft section 21 is decelerated by a deceleration mechanism that is not shown; and the decelerated drive force is outputted to the output shaft section 22. The decelerator used in the gear apparatus 2 is not limited to a specific apparatus and may, for example, be a wave-motion gear apparatus or a planetary gear decelerator. In the gear apparatus 2, the body section 23 is fixed to and supported by the base 110 via a support member 33.

The input shaft section 21 (input shaft) of the gear apparatus 2 is connected to the motor unit 3. The motor unit 3 includes a motor 31 and the second detection section 32, which detects the rotational state of the motor 31, and the motor 31 and the second detection section 32 work as a unit. The motor 31 is not limited to a specific motor and is, for example, a two-phase AC brushless motor, a three-phase AC brushless motor, a three-phase synchronous motor, or any of a variety of other motors. The housing of the motor 31 is fixed to and supported by the support member 33. The rotating shaft of the motor 31 is connected to the input shaft section 21. The second detection section 32 outputs a signal according to the rotational state of the rotating shaft of the motor 31, that is, the rotational state of the input shaft section 21 of the gear apparatus 2.

On the other hand, a shaft section 122 is connected to the output shaft section 22 (output shaft) of the gear apparatus 2. The shaft section 122 is so supported via a bearing 115 as to be pivotable around the pivotal axis J1 relative to the base 110. An arm body section 121 of the first arm 120 is attached to the shaft section 122. The first arm 120 can therefore pivot around the pivotal axis J1 relative to the base 110.

The first detection section 4 outputs a signal according to the pivotal state of the first arm 120, that is, the rotational state of the output shaft section 22 of the gear apparatus 2. The control section 5 then determines the rotational state of the output shaft section 22 on the basis of the signal from the first detection section 4. At this point, a determination section 51 provided in the control section 5 determines the rotational state of the output shaft section 22 by also using the signal from the second detection section 32. A result of the determination made by the control section 5 is, for example, used to control the motor 31.

The first detection section 4, the second detection section 32, and the determination section 51 will be described below in detail.

Second Detection Section

Figure 3:
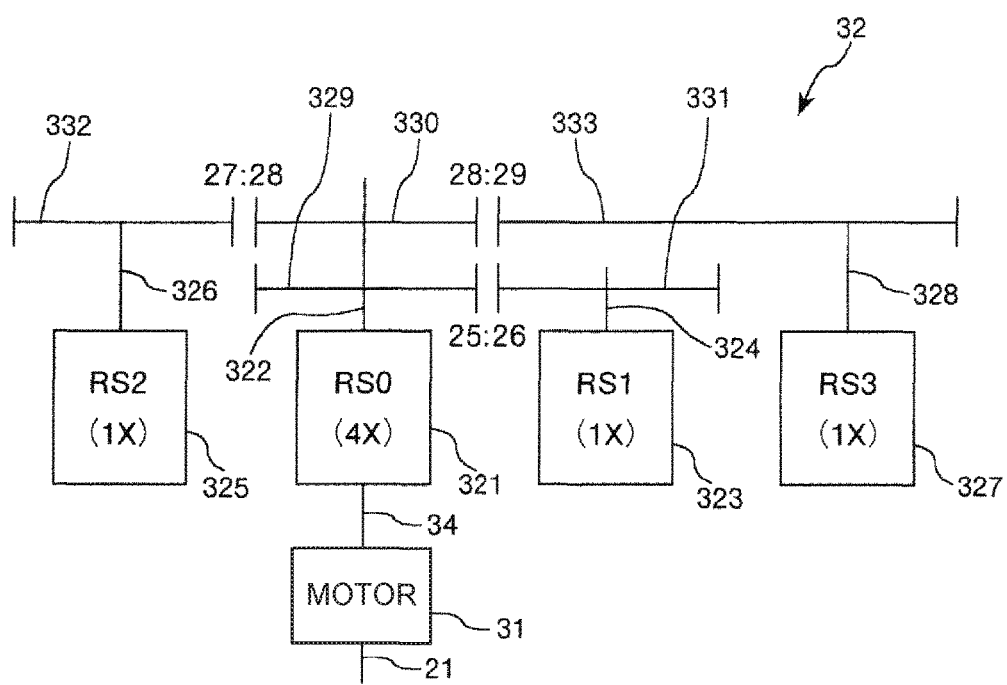
FIG. 3 describes a multiple rotation detecting encoder (second detection section) including the power transmitting apparatus shown in FIG. 2.

FIG. 3 describes a multiple rotation detecting encoder (second detection section) provided in the power transmitting apparatus shown in FIG. 2.

The second detection section 32 is a multiple rotation detecting encoder having the function of detecting the absolute position of a rotating shaft 34 of the motor 31. The second detection section 32 can therefore detect the absolute position of the input shaft section 21. The second detection section 32 includes one 4× reluctance resolver 321 and first to third three 1× reluctance resolvers 323, 325, and 327, as shown in FIG. 3.

The 4× reluctance resolver 321 outputs an absolute position data signal corresponding to four cycles while the rotating shaft 34 makes one revolution. The 1× reluctance resolvers 323, 325, and 327 each output an absolute position data signal corresponding to one cycle while the rotating shaft 34 makes one revolution. In FIG. 3, a primary rotating shaft 322 of the 4× reluctance resolver 321 is linked to the rotating shaft 34. A first driving gear 329 and a second driving gear 330 are fixed to the primary rotating shaft 322.

A first driven gear 331, which engages with the first driving gear 329, is fixed to a first secondary rotating shaft 324 of the first 1× reluctance resolver 323. A second driven gear 332, which engages with the second driving gear 330, is fixed to a second secondary rotating shaft 326 of the second 1× reluctance resolver 325. A third driven gear 333, which engages with the second driving gear 330, is fixed to a third secondary rotating shaft 328 of the third 1× reluctance resolver 327.

The three gear mechanisms described above form a power transmitting mechanism. The gear ratios among the gear mechanisms are as follows: The first driving gear 329 and the first driven gear 331 have a gear ratio of 25:26; the second driving gear 330 and the second driven gear 332 have a gear ratio of 28:27; and the second driving gear 330 and the third driven gear 333 have a gear ratio of 28:29, as shown in FIG. 3.

The thus configured second detection section 32 outputs a signal according to the rotational state of the input shaft section 21. The signal contains a signal according to the number of revolutions of the input shaft section 21.

The second detection section 32 is therefore a counter that detects the number of revolutions of the input shaft section 21. The second detection section 32 can therefore output a signal according to the number of revolutions of the input shaft section 21.

In particular, since the second detection section 32, which is a "counter," is a multiple rotation detecting encoder, the second detection section 32 can output a signal according to the number of revolutions and rotational angle of the input shaft section 21. The thus configured multiple rotation detecting encoder can also be used to control the motor 31.

Therefore, the power transmitting apparatus 1 includes the motor 21, which is connected to the input shaft section 21, and the second detection section 32, which is a "multiple rotation detecting encoder," is disposed on the motor 31. The size of the entire power transmitting apparatus 1 can therefore be reduced. Further, the power transmitting apparatus 1 can be readily installed.

First Detection Section

Figure 4:
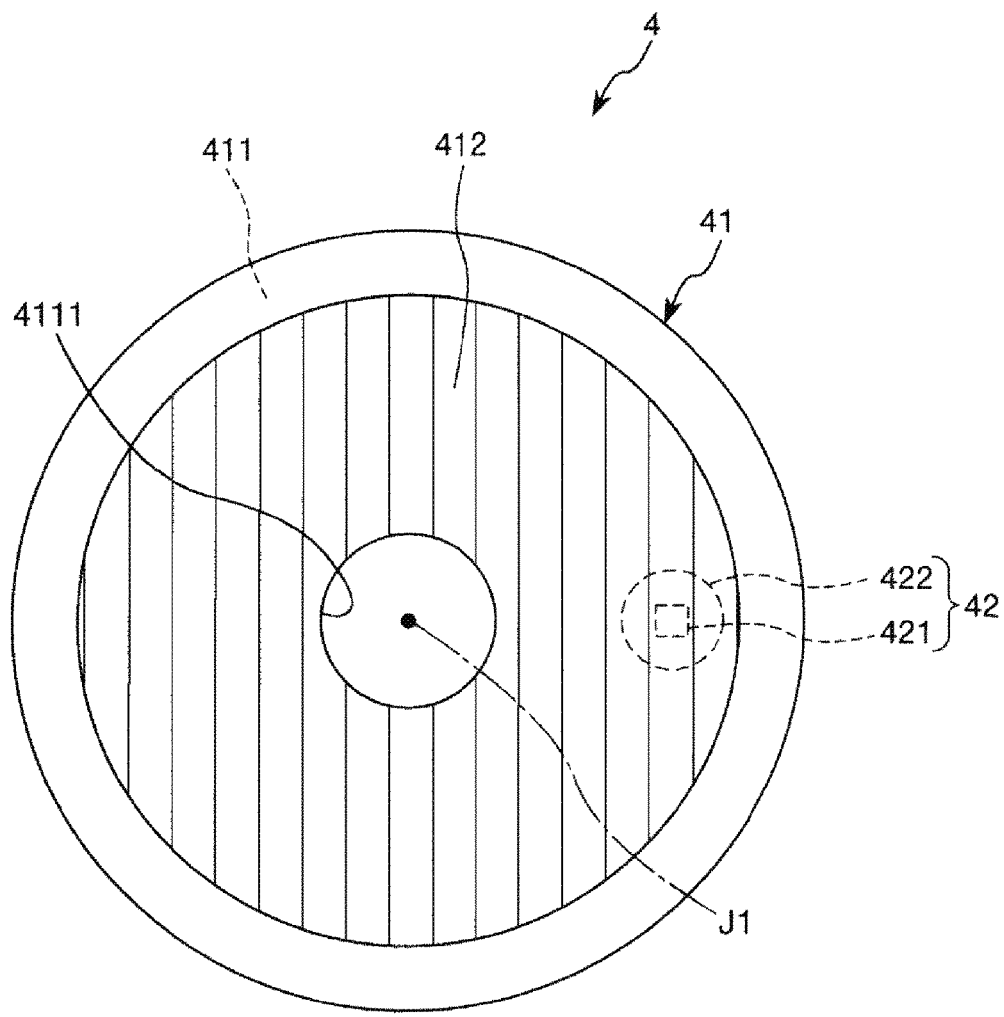
FIG. 4 is a plan view for describing an optical encoder (first detection section) provided in the power transmitting apparatus shown in FIG. 2.

FIG. 4 is a plan view for describing an optical encoder (first detection section) provided in the power transmitting apparatus shown in FIG. 2.

The first detection section 4 shown in FIG. 4 is a reflective optical rotary encoder. The first detection section 4 includes an optical scale 41, which pivots around the pivotal axis J1, and a sensor unit 42, which is so fixed and disposed as to face the optical scale 41.

The optical scale 41 includes a substrate 411 and a polarizing section 412, which is provided on one surface of the substrate 411. The sensor unit 42 includes a light source section 421 and a light detection section 422. Each portion of the first detection section 4 will be described below in detail.

Optical Scale

The optical scale 41 has a disc-like shape, and a hole 4111, which passes through the optical scale 41 in the thickness direction, is provided in a central portion of the optical scale 41, as shown in FIG. 4. The optical scale 41 is attached to a member (output shaft section 22 or shaft section 122 shown in FIG. 2) that pivots around the pivotal axis J1. The optical scale 41 includes the substrate 411 and the polarizing section 412, which is provided on one surface of the substrate 411, as described above, and the polarizing section 412 rotates when the output shaft section 22 rotates.

The substrate 411 is transparent to the light from the light source section 421. The substrate 411 is not necessarily made of a specific material and is made, for example, of a glass material or a resin material. The substrate 411 may be provided as required and can be omitted.

The polarizing section 412 is disposed on one surface (lower surface in FIG. 6) of the thus formed substrate 411. The polarizing section 412 has a polarization characteristic that allows selective transmission of P-polarized light and selective reflection of S-polarized light. The polarizing section 412, for example, has a polarizing pattern formed of a plurality of wires that reflect the light from the light source section 421 and are arranged in parallel to one another with a gap therebetween.

The polarizing pattern is made of a metal material, for example, aluminum (Al), copper (Cu), chromium (Cr), gold (Au), iron (Fe), platinum (Pt), or an alloy thereof. That is, the polarizing section 412 has a plurality of linearly extending metal wires. The thus configured polarizing section 412 may be formed, for example, by using a known film formation method or by etching or otherwise processing a sheet-shaped or plate-shaped member.

Sensor Unit

Figure 5:
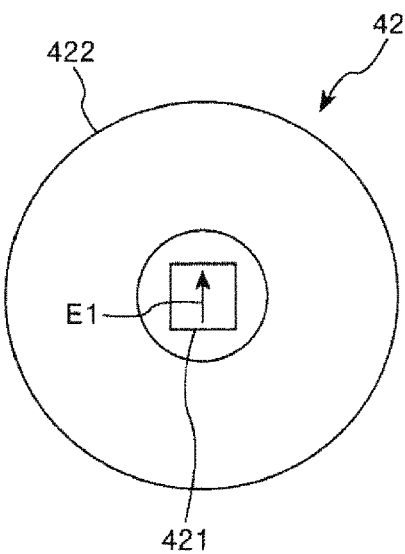
FIG. 5 is a plan view for describing a light source section and a light detection section provided in the optical encoder shown in FIG. 4.
Figure 6:
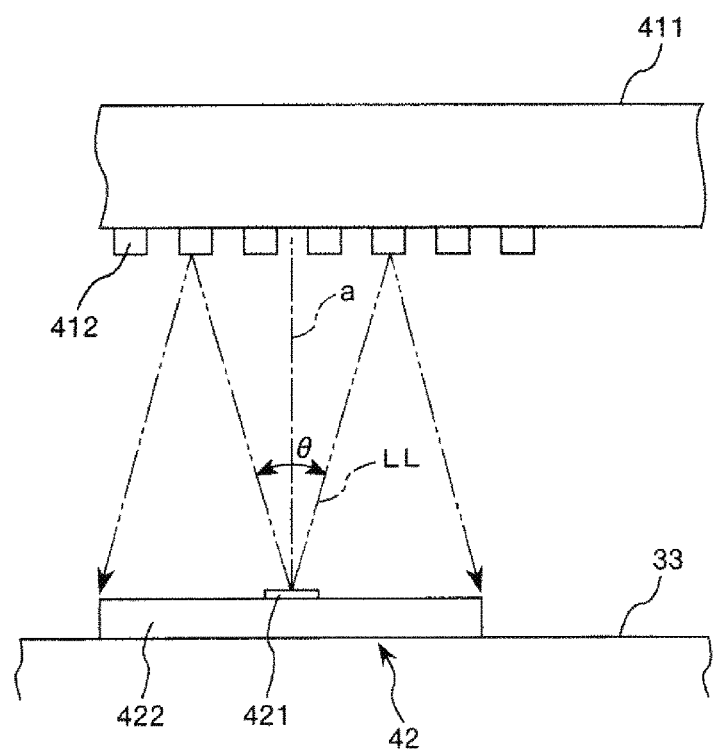
FIG. 6 is a diagrammatic cross-sectional view for describing the light source section and the light detection section provided in the optical encoder shown in FIG. 4.

FIG. 5 is a plan view for describing the light source section and the light detection section provided in the optical encoder shown in FIG. 4. FIG. 6 is a diagrammatic cross-sectional view for describing the light source section and the light detection section provided in the optical encoder shown in FIG. 4.

The sensor unit 42 is attached to a member (support member 33 shown in FIG. 2) that does not pivot around the pivotal axis J1. The sensor unit 42 includes the light source section 421 and the light detection section 422, as described above.

The light source section 421 and the light detection section 422 are attached to the member (support member 33 shown in FIG. 2) that does not pivot around the pivotal axis J1. The light source section 421 has the function of irradiating the polarizing section 412 with light, more specifically, the function of outputting light linearly polarized in the direction indicated by the arrow E1 in FIG. 5. The light source section 421 irradiates the polarizing section 412 of the optical scale 41 with light LL, as shown in FIG. 6. The light LL is so outputted from the light source section 421 as to spread at a radiation angle θ around the optical axis a of the light source section 421.

The light source section 421 is, for example, a vertical cavity surface emitting laser (VCSEL). The light source section 421 is preferably configured to stably output light linearly polarized in a desired direction. A preferable example of the light source section 421 will be described below.

Figure 7:
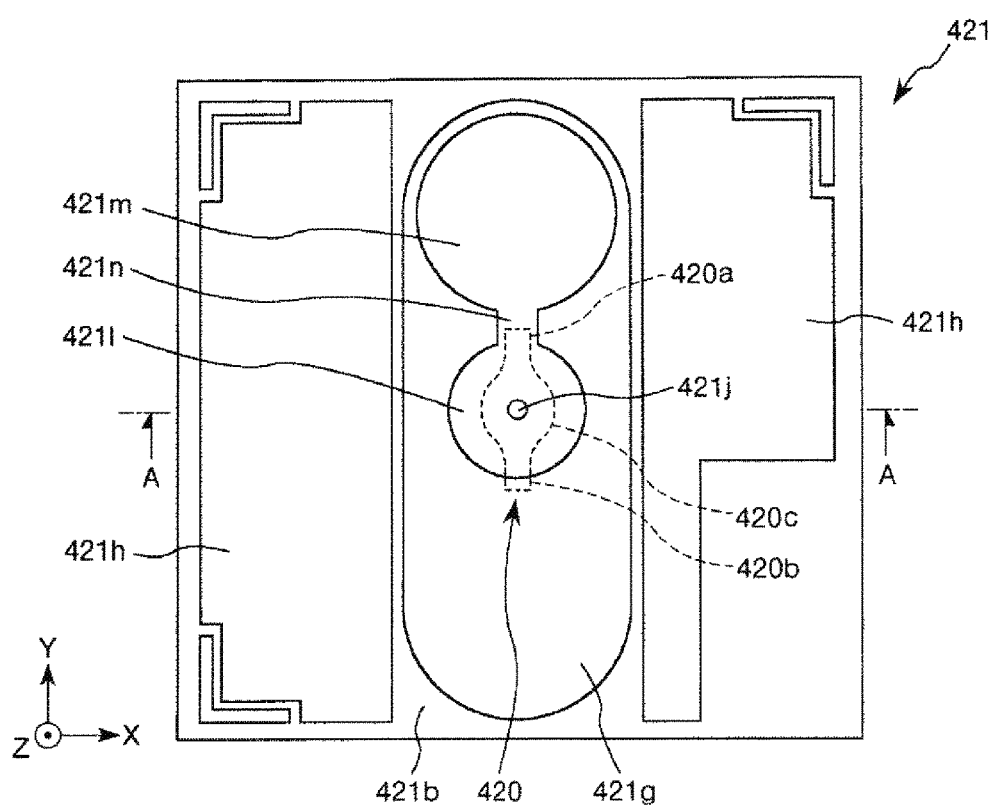
FIG. 7 is a plan view showing an example of the configuration of the light source section provided in the optical encoder shown in FIG. 4.
Figure 8:
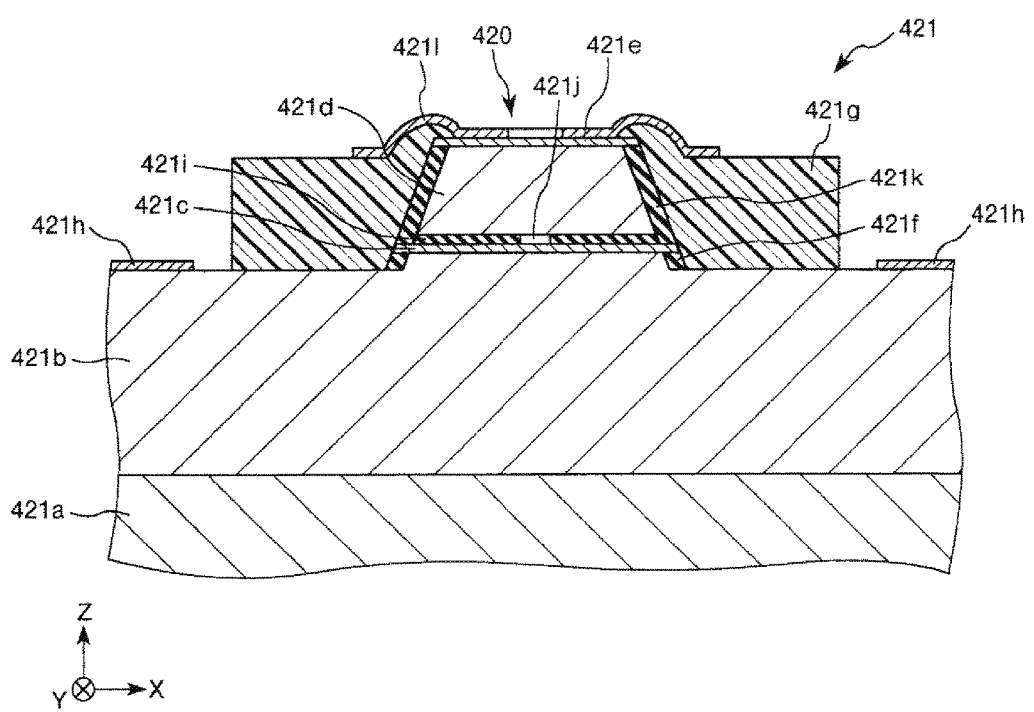
FIG. 8 is a cross-sectional view taken along the line A-A in FIG. 7.

FIG. 7 is a plan view showing an example of the configuration of the light source section provided in the optical encoder shown in FIG. 4. FIG. 8 is a cross-sectional view taken along the line A-A in FIG. 7.

The light source section 421 shown in FIGS. 7 and 8 includes a substrate 421a, a first mirror layer 421b, an active layer 421c, a second mirror layer 421d, a current narrowing layer 421i, a contact layer 421e, a first area 421f, a second area 421k, a resin layer 421g, a first electrode 421h, a second electrode 421l, a pad 421m, and a drawing wiring line 421n. The first mirror layer 421b, the active layer 421c, the second mirror layer 421d, the current narrowing layer 421i, the contact layer 421e, the first area 421f, and the second area 421k form a laminate 420. The laminate 420 is surrounded by the resin layer 421g.

The substrate 421a is, for example, an n-type (first conductivity type) GaAs substrate.

The first mirror layer 421b is provided on the substrate 421a. The first mirror layer 421b is formed, for example, by alternately layering a high-refractive-index layer that is an n-type $Al_{0.12}Ga_{0.88}As$ layer to which silicon is doped and a low-refractive-index layer that is an n-type $Al_{0.9}Ga_{0.1}As$ layer to which silicon is doped.

The active layer 421c is provided on the first mirror layer 421b. The active layer 421c has, for example, a multiple quantum well (MQW) structure in which three quantum well structures each formed of an i-type $In_{0.06}Ga_{0.94}As$ layer and an i-type $Al_{0.3}Ga_{0.7}As$ layer are layered on each other.

The second mirror layer 421d is provided on the active layer 421c. The second mirror layer 421d is formed, for example, by alternately layering a high-refractive-index layer that is a p-type $Al_{0.12}Ga_{0.88}As$ layer to which carbon is doped and a low-refractive-index layer that is a p-type $Al_{0.9}Ga_{0.1}As$ layer to which carbon is doped.

The second mirror layer 421d, the active layer 421c, and the first mirror layer 421b form a vertical-resonator-type pin diode. When voltage in the forward direction of the pin diode is applied between the first electrode 421h and the second electrode 421l, electrons and holes are recombined with each other in the active layer 421c, resulting in light emission. The light produced in the active layer 421c travels back and forth between the first mirror layer 421b and the second mirror layer 421d (undergoes multiple reflection), resulting in stimulated emission and hence intensity amplification. Once the optical gain exceeds the optical loss, laser oscillation occurs, whereby a laser beam exits out of the light source section 421 via the contact layer 421e.

The current narrowing layer 421i is provided between the active layer 421c and the second mirror layer 421d. The current narrowing layer 421i may instead be provided in the first mirror layer 421b or the second mirror layer 421d. The current narrowing layer 421i is an insulating layer having an opening 421j formed therein. The current narrowing layer 421i has the function of preventing current flowing between the first electrode 421h and the second electrode 421l from spreading in the direction along the active layer 421c.

The contact layer 421e is provided on the second mirror layer 421d. The contact layer 421e is, for example, a p-type GaAs layer to which carbon is doped.

The first area 421f is provided on the lateral side of a protruding portion of the first mirror layer 421b. The first area 421f is formed, for example, by alternately layering the following two layers: an oxide layer produced by oxidizing a layer contiguous to the low-refractive-index layer of the first mirror layer 421b ($Al_{0.9}Ga_{0.1}As$ layer, for example); and a layer contiguous to the high-refractive-index layer of the first mirror layer 421b ($Al_{0.12}Ga_{0.88}As$ layer, for example).

The second area 421k is provided on the lateral side of the second mirror layer 421d. The second area 421k is formed, for example, by alternately layering the following two layers: an oxide layer produced by oxidizing a layer contiguous to the low-refractive-index layer of the second mirror layer 421d ($Al_{0.9}Ga_{0.1}As$ layer, for example); and a layer contiguous to the high-refractive-index layer of the second mirror layer 421d ($Al_{0.12}Ga_{0.88}As$ layer, for example).

The laminate 420 formed of the thus configured first mirror layer 421b, active layer 421c, second mirror layer 421d, current narrowing layer 421i, contact layer 421e, first area 421f, and second area 421k has a length of the laminate 420 in the Y-axis direction longer than the length of the laminate 420 in the X-axis direction in a plan view. In FIG. 7, the laminate 420 has a shape symmetric with respect to both the Y-axis and X-axis directions in the plan view.

The laminate 420 includes a first distortion imparting section 420a, a second distortion imparting section 420b, and a resonator 420c in the plan view, as shown in FIG. 7.

The first distortion imparting section 420a and the second distortion imparting section 420b face each other in the Y-axis direction with the resonator 420c therebetween in the plan view. The first distortion imparting section 420a and the second distortion imparting section 420b are integrated with the resonator 420c.

The first distortion imparting section 420a and the second distortion imparting section 420b impart distortion to the active layer 421c to polarize the light produced in the active layer 421c. The term "polarize light" refers to causing the electric field of the light to oscillate in a fixed direction.

The resonator 420c is provided between the first distortion imparting section 420a and the second distortion imparting section 420b. The length of the resonator 420c in the X-axis direction is greater than the length of the first distortion imparting section 420a in the X-axis direction or the length of the second distortion imparting section 420b in the X-axis direction. The resonator 420c has, for example, a circular planar shape. The resonator 420c causes the light produced in the active layer 421c to resonate.

The resin layer 421g is provided at least on the side surface of the laminate 420. The resin layer 421g may completely cover the first distortion imparting section 420a and the second distortion imparting section 420b or may cover part of the first distortion imparting section 420a and the second distortion imparting section 420b. The resin layer 421g is made, for example, of a polyimide.

The first electrode 421h is provided on the first mirror layer 421b. The first electrode 421h is in ohmic contact with the first mirror layer 421b. The first electrode 421h is electrically connected to the first mirror layer 421b. The first electrode 421h is formed, for example, by layering a Cr layer, an AuGe layer, an Ni layer, and an Au layer in this order from the side facing the first mirror layer 421b. The first electrode 421h is one of the electrodes for injecting current into the active layer 421c. The first electrode 421h may instead be provided on the lower surface of the substrate 421a.

The second electrode 421l is provided on the contact layer 421e and the resin layer 421g. The second electrode 421l is in ohmic contact with the contact layer 421e. The second electrode 421l is electrically connected to the second mirror layer 421d via the contact layer 421e. The second electrode 421l is formed, for example, by layering a Cr layer, a Pt layer, a Ti layer, a Pt layer, and an Au layer in this order from the side facing the contact layer 421e. The second electrode 421l is the other one of the electrodes for injecting current into the active layer 421c.

The second electrode 421l is electrically connected to the pad 421m. The second electrode 421l is electrically connected to the pad 421m via the drawing wiring line 421n. The pad 421m is provided on the resin layer 421g. The pad 421m and the drawing wiring line 421n are made, for example, of the same material of the second electrode 421l.

According to the light source section 421 described above, the length of the laminate 420 in the Y-axis direction is greater than the length of the laminate 420 in the X-axis direction in the plan view, and the length of the resin layer 421g in the Y-axis direction is greater than the length of the resin layer 421g in the X-axis direction in the plan view. Therefore, the first and second distortion imparting sections 420a, 420b and the resin layer 421g can both impart stress to the active layer 421c, and the polarization direction of the laser beam outputted from the active layer 421c can be stabilized. The polarization direction of the laser beam can therefore be more stabilized, for example, than in a case where only the resin layer 421g (or first and second distortion imparting sections 420a, 420b) imparts stress to the active layer 421c.

The light source section 421 is not necessarily made of an AlGaAs-based semiconductor material and may be made, for example, of a GaInP-based, ZnSSe-based, InGaN-based, AlGaN-based, InGaAs-based, GaInNAs-based, or GaAsSb-based semiconductor material in accordance with the oscillation wavelength. The light source section 421 is not limited to a vertical cavity surface emitting laser and may instead be a semiconductor laser of another type or a light emitting diode. In the case where the light source section 421 is a light emitting diode, a polarizing element only needs to be disposed between the light source section 421 or the light detection section 422 and the polarizing section 412.

The light detection section 422 shown in FIGS. 5 and 6 has an annular light receiving surface, and the light source section 421 is disposed inside the light receiving surface in the plan view. The light detection section 422 is, for example, a photodiode. The light detection section 422 has the function of receiving the light LL (reflected light) from the polarizing section 412 and outputting a signal according to the intensity of received light, more specifically, the function of outputting a detection signal in the form of current according to the intensity of the light LL reflected off the polarizing section 412.

In the first detection section 4 configured as described above, the light source section 421 irradiates the polarizing section 412 of the optical scale 41 with light. The light detection section 422 then receives light reflected off the polarizing section 412. The determination section 51 uses the signal (current value) from the light detection section 422 to determine the rotational state of the optical scale 41.

Determination Section

The determination section 51 shown in FIG. 2 is formed, for example, of a CPU (central processing unit) and an SRAM (static random access memory) and has the function of determining the rotational state of the optical scale 41 by using the signal from the light detection section 422. Examples of the rotational state may include the pivotal position, the pivotal angle, the pivotal speed, and the pivotal direction.

In particular, the determination section 51 has the function of determining the rotational state of the polarizing section 412 on the basis of the signal from the light detection section 422 and the signal from the second detection section 32.

The signal from the light detection section 422 is a phase-A signal. The sensor unit 42 includes, although not shown, a light receiving device that outputs a phase-B signal that is out of phase by 45° with the phase-A signal. The determination section 51 uses the phase-A signal and the phase-B signal to determine the pivotal position of the optical scale 41 within the pivotal angle range of 180°.

Figure 9:
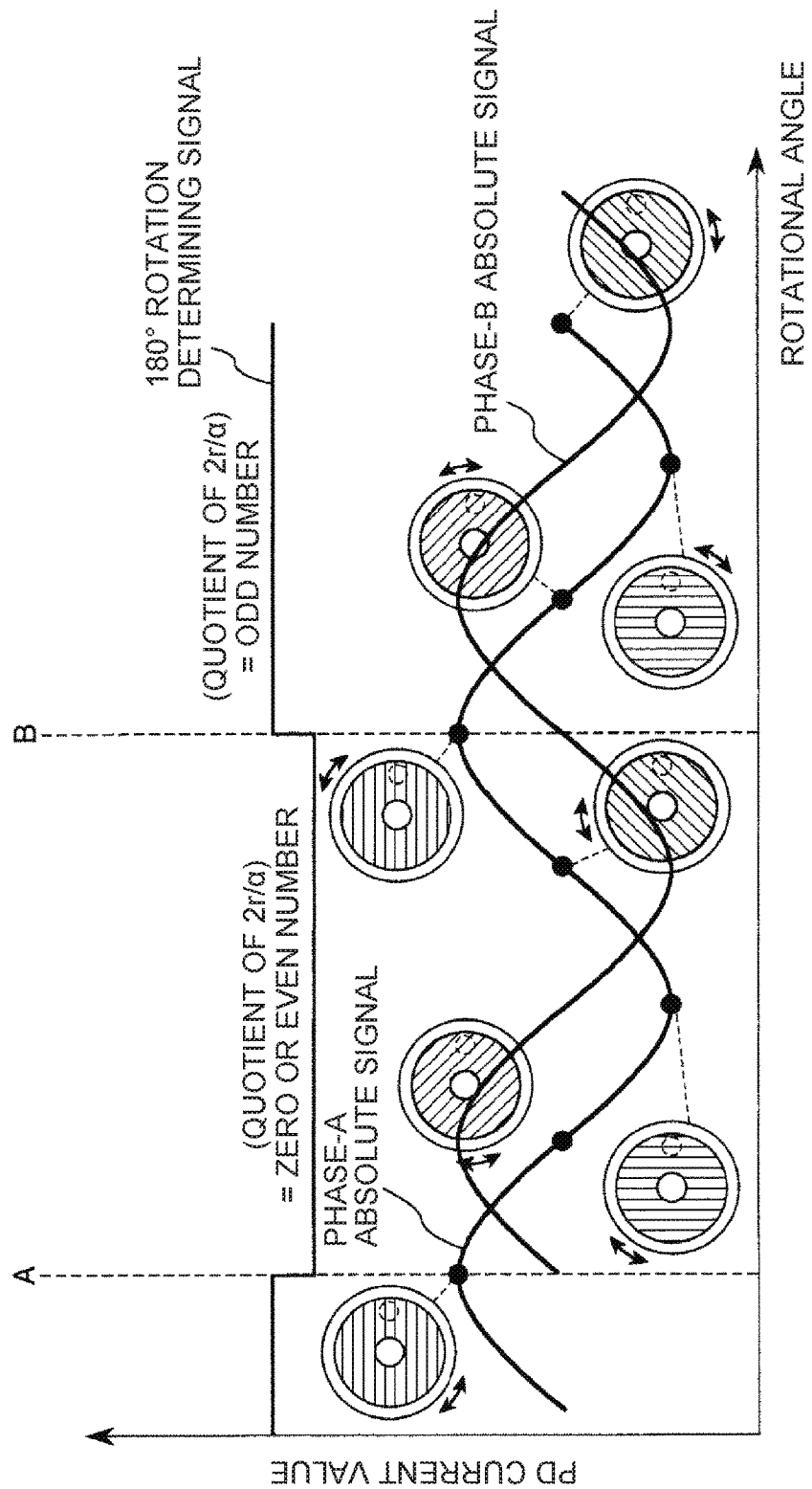
FIG. 9 shows graphs illustrating the relationship between the rotational angle of an optical scale and outputs (current values) from the light detection section (first detection section) and the second detection section in the optical encoder shown in FIG. 4.

FIG. 9 shows graphs illustrating the relationship between the rotational angle of the optical scale and the outputs (current values) from the light detection section (first detection section) and the second detection section in the optical encoder shown in FIG. 4.

The light LL outputted from the light source section 421 is linearly polarized in one direction, as described above. The polarizing section 412, which is irradiated with the light LL, has a polarization characteristic that allows selective transmission of P-polarized light and selective reflection of S-polarized light.

The thus configured polarizing section 412 is irradiated with the light LL, and the light LL is reflected off the polarizing section 412 at reflectance that changes in accordance with the pivotal angle of the optical scale 41. The current value (PD current value) of the signal from the light detection section 422 (phase-A absolute signal) therefore changes along a sinusoidal wave in accordance with the pivotal angle (rotational angle) of the optical scale 41, as shown in FIG. 9. The pivotal angle of the optical scale 41 ranges from 0 to $2\pi$, and the current value of the signal from the light detection section 422 follows the same waveform in the range from 0 to $\pi$ and the range from $\pi$ to $2\pi$. Therefore, only the signal from the light detection section 422 does not allow distinction between the two states of the pivotal angle of the optical scale 41, 0 to $\pi$ and $\pi$ to $2\pi$ (distinction between the state in which the rotational angle is A and the state in which the rotational angle is B in FIG. 9).

In view of the fact described above, the signal from the second detection section 32 (including signal according to number of revolutions of input shaft section 21) is used to determine whether the pivotal angle of the optical scale 41 falls within the range from 0 to $\pi$ or the range from $\pi$ to $2\pi$.

In a specific description, let $\alpha$ be the speed transmission ratio (deceleration ratio) representing the ratio of the speed of the input shaft section 21 of the gear apparatus 2 to the speed of the output shaft section 22 thereof. Since the output shaft section 22 makes one revolution whenever the input shaft section 21 makes $\alpha$ revolutions, the position of the output shaft section 22 changes from a position in one 180°-area to a position in the other 180°-area whenever the input shaft section 21 makes ($\alpha/2$) revolutions. Therefore, let r be the number of revolutions of the input shaft section 21, and whether the pivotal angle of the optical scale 41 falls within the range from 0 to $\pi$ or the range from $\pi$ to $2\pi$ can be determined by evaluating whether the quotient of $2r/\alpha$ is an odd or even number, as shown in FIG. 9. The the rotational states of the polarizing section 412 that differ from each other by 180° can thus be distinguished from each other. In FIG. 9, a signal having a greater magnitude in the case where the quotient of $2r/\alpha$ is an odd number than in the case where the quotient is zero or an even number (or even number may be so defined as to include zero) is shown as 180° rotation determining signal. The "speed transmission ratio" is the value obtained by division of the angular velocity of a first driving gear of a gear train of the gear apparatus 2 and the angular velocity of the last driven gear of the gear train (angular velocity of driving gear/angular velocity of driven gear). A deceleration ratio is the speed transmission ratio of a pair of deceleration gears (or deceleration gear train), and an acceleration ratio is the reciprocal of the speed transmission ratio of a pair of acceleration gears (or acceleration gear train).

For example, in a case where the speed transmission ratio $\alpha$ of the gear apparatus 2 is 50 and the output shaft section 22 makes one revolution whenever the input shaft section 21 makes 50 revolutions, and on the assumption that the number of revolutions r of the input shaft section 21 ranging from −5 to +5 revolutions corresponds to A shown in FIG. 9 and an area therearound and the number of revolutions r of the input shaft section 21 ranging from +20 to +30 revolutions corresponds to B shown in FIG. 9 and an area therearound, the rotational angle of the optical scale 41 can be readily determined to be an angle in the vicinity of B shown in FIG. 9 when the number of revolutions r of the input shaft section 21 is 24. In this case, $2r/\alpha$ is $(2\times24)/50=0$ with a remainder of 48, which means that the quotient is an even number.

Use of the remainder of $2r/\alpha$ in addition to the quotient of $2r/\alpha$ allows more detailed estimation of the rotational angle of the optical scale 41. For example, in the case described above, when the quotient is an even number and the remainder is greater than or equal to 20 or when the quotient is an odd number and the remainder is smaller than or equal to 5, the rotational angle of the optical scale 41 can be estimated to be a value in the vicinity of B shown in FIG. 9.

The power transmitting apparatus 1 described above includes the gear apparatus 2, which is the "power transmitting section," the first detection section 4, the second detection section 32, and the determination section 51, as described above. The gear apparatus 2 includes the input shaft section 21 and the output shaft section 22 and transmits drive force from the input shaft section 21 to the output shaft section 22. The first detection section 4 includes the polarizing section 412, which rotates when the output shaft section 22 rotates and has a polarization characteristic, the light source section 421, which irradiates the polarizing section 412 with light, and the light detection section 422, which outputs a signal according to the intensity of the light from the polarizing section 412. The second detection section 32 outputs a signal according to the rotational state of the input shaft section 21. The determination section 51 determines the rotational state of the polarizing section 412 on the basis of the signal from the light detection section 422 and the signal from the second detection section 32. According to the thus configured power transmitting apparatus 1, the two states of the polarizing section 412 that differ from each other by 180° can be distinguished from each other without providing a determination pattern on the optical scale 41 including the polarizing section 412.

The gear apparatus 2, which is the "power transmitting section," is a gear apparatus (decelerator) that decelerates the drive force inputted to the input shaft section 21 and outputs the decelerated drive force to the output shaft section 22. The polarizing section 412 rotates when the output shaft section 22 rotates. The second detection section 32 outputs a signal according to the rotational state of the input shaft section 21. The determination section 51 uses the quotient of $2r/\alpha$, where $\alpha$ represents the speed transmission ratio representing the ratio of the speed of the input shaft section 21 of the gear apparatus 2 to the speed of the output shaft section 22 thereof and r represents the number of revolutions of the input shaft section 21, to distinguish the rotational states of the polarizing section 412 that differ from each other by 180° from each other. As a result, in the case where the drive force inputted to the input shaft section 21 is decelerated and the decelerated drive force is outputted to the output shaft section 22, the two states of the polarizing section 412 that differ from each other by 180° can be distinguished from each other even when the numbers of revolutions of the input shaft section 21 and the output shaft section 22 differ from each other. In a case where the gear apparatus 2 is a gear apparatus (accelerator) that accelerates the drive force inputted to the input shaft section 21 and outputs the accelerated drive force to the output shaft section 22, use of the angular information (rotational angle of input shaft section 21) contained in the signal from the second detection section 32 allows distinction between the two states of the polarizing section 412 that differ from each other by 180°.

Further, the determination section 51 can use both the quotient and remainder of $2r/\alpha$ to distinguish the rotational states of the polarizing section 412 that differ from each other by 180° from each other for accurate distinction between the two states of polarizing section 412 that differ from each other by 180°.

Second Embodiment

Figure 10:
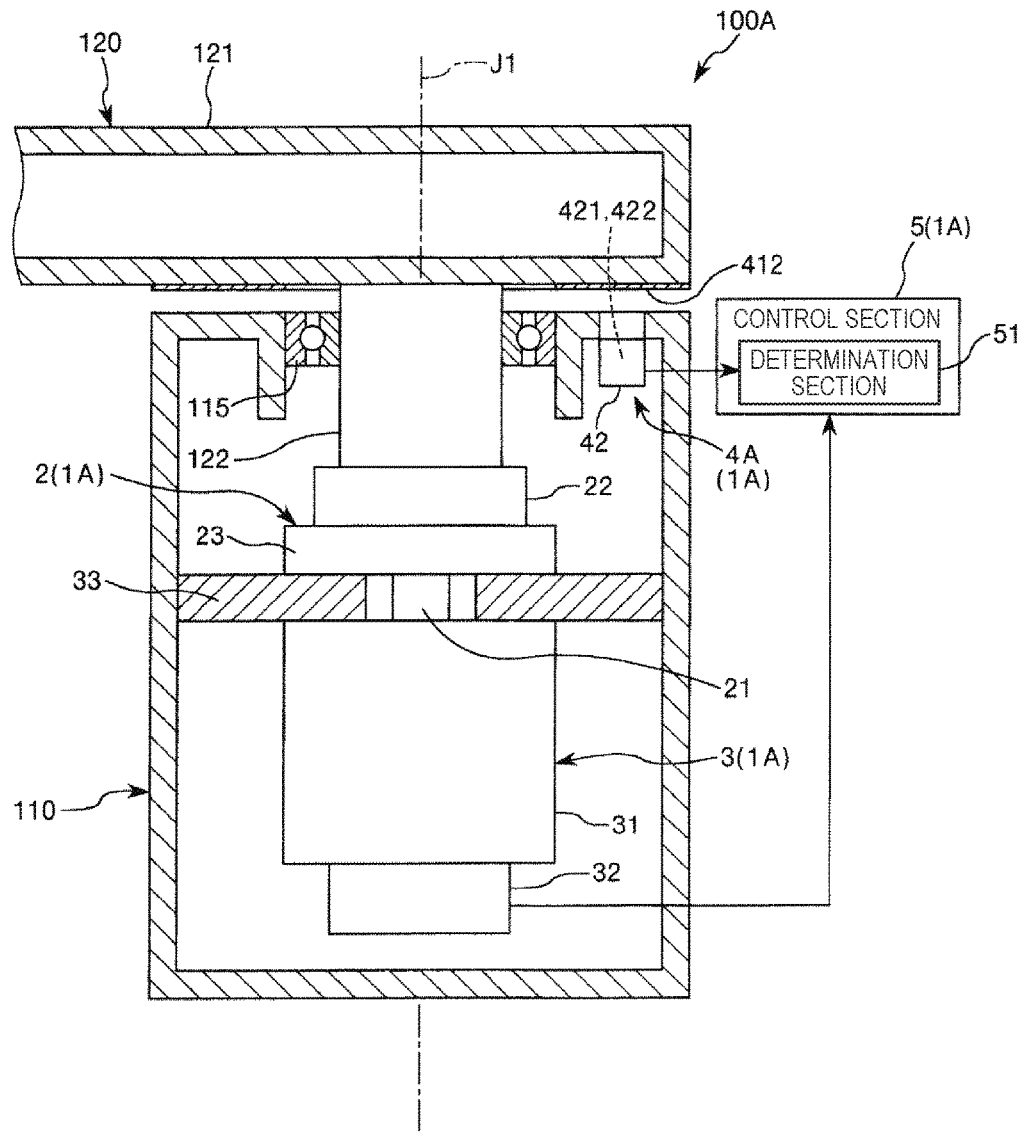
FIG. 10 is a cross-sectional view for describing a power transmitting apparatus according to a second embodiment of the invention.

FIG. 10 is a cross-sectional view for describing a power transmitting apparatus according to a second embodiment of the invention.

The second embodiment will be described below. It is, however, noted that points different from those in the above embodiment will be primarily described and the same items will not be described. In FIG. 10, the same configurations as those in the embodiment described above have the same reference characters.

The present embodiment is the same as the first embodiment described above except that the first detection section is differently configured.

A power transmitting apparatus 1A provided in a robot 100A shown in FIG. 10 includes a first detection section 4A. The first detection section 4A includes the polarizing section 412, which is provided on a surface of the arm body section 121 (lower outer surface in FIG. 10) of the first arm 120, and the sensor unit 42, which includes the light source section 421 and the light detection section 422 so fixed to and disposed in the base 110, specifically, in an upper portion thereof in FIG. 10 as to face the polarizing section 412. The polarizing section 412 is so disposed as to cover the area of a pivotal basal end portion of the arm body section 121 (right portion in FIG. 10). The detection principle employed by the first detection section 4A is the same as that described with reference to the first detection section 4 in the first embodiment.

As described above, the robot 100A includes the first arm 120, which is an "arm" having a surface on which the polarizing section 412 is provided. As a result, in the robot 100A including an arm, the polarizing section 412 can be provided by effective use of a surface of the arm. No member for providing the polarizing section 412 is therefore separately required. As a result, the number of parts can be reduced.

The second embodiment described above also allows distinction between the two states of the polarizing section 412 that differ from each other by 180° and reduction in size of the optical scale.

3. Printer

Figure 11:
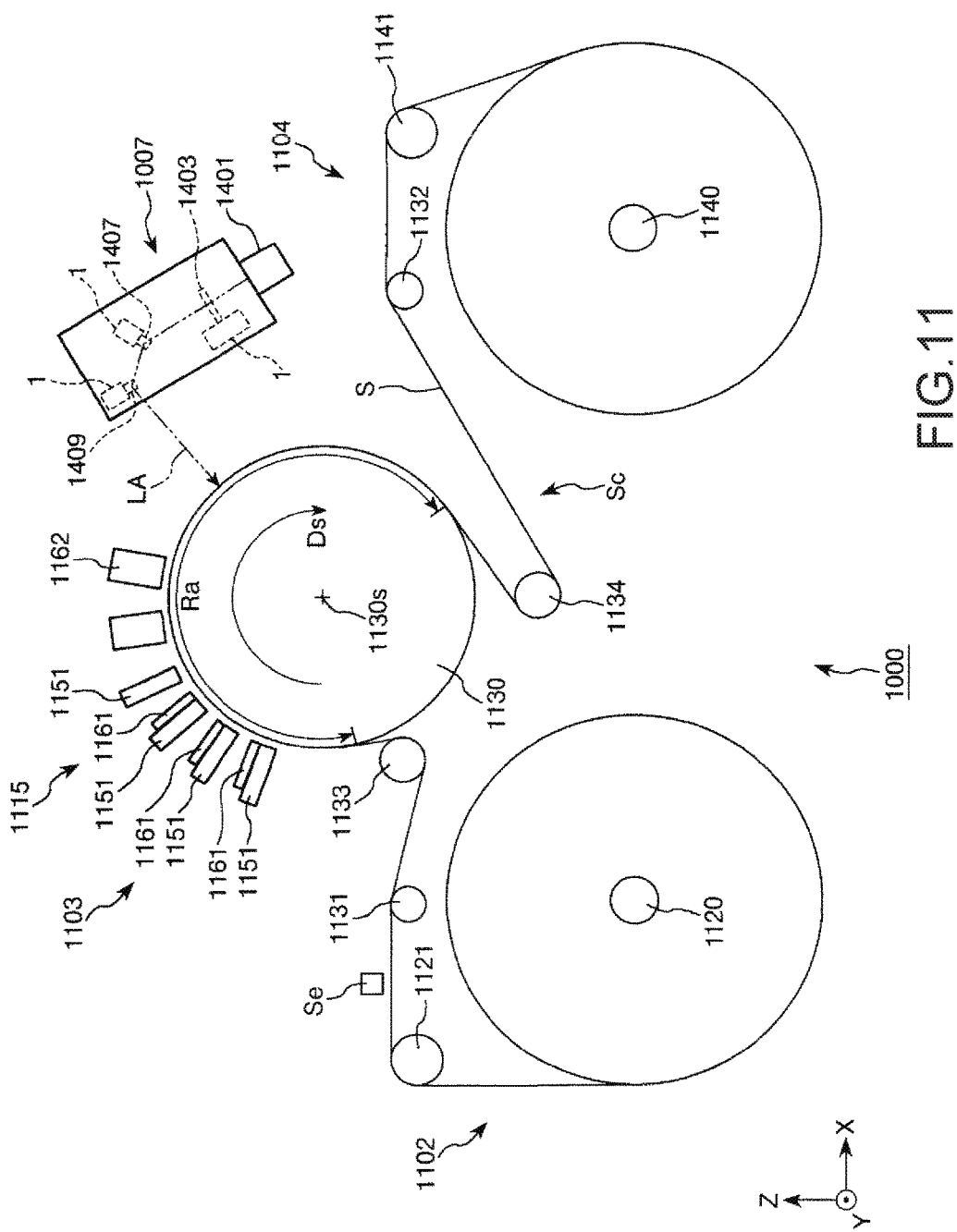
FIG. 11 is a diagrammatic view showing an example of a printer according to an embodiment of the invention.

FIG. 11 is a diagrammatic view showing an example of a printer according to an embodiment of the invention.

A printer 1000 shown in FIG. 11 is a label printing apparatus including a drum-shaped platen. In the printer 1000, a single sheet S (web), such as a paper-based sheet and a film-based sheet, which is wound in the form of a roll as a recording medium and opposite ends of which are wound around a feeding shaft 1120 and a winding shaft 1140, is stretched between the feed shaft 1120 and the take-up shaft 1140, and the sheet S is transported along a transport path Sc for the thus stretched sheet S from the feeding shaft 1120 to the winding shaft 1140. The printer 1000 is configured to discharge a functional fluid onto the sheet S transported along the transport path Sc to record (form) an image on the sheet S.

The printer 1000 includes, as a general configuration, a feeding section 1102, which feeds the sheet S from the feeding shaft 1120, a processing section 1103, which records an image on the sheet S fed from the feeding section 1102, a laser scanner 1007, which cuts the sheet S on which the processing section 1103 has recorded the image, and a winding section 1104, which winds the sheet S around the winding shaft 1140.

The feeding section 1102 includes the feeding shaft 1120, around which the end portion of the sheet S is wound, and a driven roller 1121, around which the sheet S having taken out from the feeding shaft 1120 is wound.

The processing section 1103 is a section in which the sheet S fed from the feeding section 1102 is supported by a platen drum 1130 as a support and recording heads 1151 and other components, which are arranged in a head unit 1115 disposed along the outer circumferential surface of the platen drum 1130, carry out processes as appropriate to record an image on the sheet S.

The platen drum 1130 is a cylindrical drum so supported by a support mechanism that is not shown as to be rotatable around a drum axis 1130s, and the sheet S transported from the feeding section 1102 to the winding section 1104 is so wound around the platen drum 1130 that the rear surface of the sheet S (surface opposite recording surface) faces the platen drum 1130. The platen drum 1130 supports the sheet S on the side facing the rear surface thereof while so driven by frictional force between the platen drum 1130 and the sheet S as to rotate in the transport direction Ds, in which the sheet S is transported. The processing section 1103 is provided with driven rollers 1133 and 1134, which fold the sheet S on opposite sides of the portion where the sheet S is wound around the platen drum 1130. Driven rollers 1121 and 1131 are further provided in the space between the feeding shaft 1120 and the driven roller 1133, and driven rollers 1132 and 1144 are provided in the space between the winding shaft 1140 and the driven roller 1134.

The processing section 1103 includes the head unit 1115, which is provided with four recording heads 1151 corresponding to yellow, cyan, magenta, and black. The recording heads 1151 face the front surface of the sheet S wound around the platen drum 1130 with a slight clearance (platen gap) between the sheet S and the front surface of the platen drum 1130 and discharge functional fluids having corresponding the colors through nozzles in the inkjet method. The functional fluids are discharged by the recording heads 1151 onto the sheet S transported in the transport direction Ds to form a color image on the front surface of the sheet S.

The functional fluids are each a UV (ultraviolet) ink that cures when irradiated with ultraviolet rays (light) (photocuring ink). To temporarily cure the UV inks to fix them on the sheet S, first UV light sources 1161 (light radiators) are provided between the plurality of recording heads 1151. Further, a second UV light source 1162, which serves as a curing section for final cure, is provided in a position downstream of the plurality of recording heads 1151 (head unit 1115) in the transport direction Ds.

The laser scanner 1007 is so provided as to partially cut or divide the sheet S on which an image has been recorded. The sheet S, which is a target to be processed, is irradiated with the laser beam emitted from a laser oscillator 1401 in the laser scanner 1007 via a first lens 1403, a first mirror 1407, a second mirror 1409, and other components, the positions or rotational positions (angles) of which are controlled by the power transmitting apparatus 1. A laser beam LA with which the sheet S is irradiated is thus so controlled by the power transmitting apparatus 1 in terms of irradiation position that a desired positon on the sheet S can be irradiated with the laser beam LA. The sheet S is partially cut or divided along a portion irradiated with the laser beam LA in the thermal cutting process.

As described above, the printer 1000, which includes the power transmitting apparatus 1 according to any of the embodiments of the invention that allows the optical scale including the polarizing section to be compact, can be designed with increased flexibility.

The power transmitting apparatus, the robot, and the printer according to the preferable embodiments of the invention have been described with reference to the drawings. The invention is, however, not limited to the embodiments, and the configuration of each portion can be replaced with an arbitrary configuration having the same function. Further, other arbitrary components may be added to the embodiments described above.

The location where the power transmitting apparatus is disposed is not limited to the joint between the base and the first arm and may be the joint between arbitrary two arms that pivot relative to each other. Further, the location where the power transmitting apparatus is disposed is not limited to a joint provided in a robot.

In the embodiments described above, the number of robot arms is one, but not necessarily, and the number of robot arms may, for example, be two or greater. That is, the robot according to the embodiment of the invention may, for example, be a multi-arm robot, such as a double-arm robot.

In the embodiments described above, the number of arms of the robot is two, but not necessarily, and the number of arms may, for example, be one or three or greater.

In the embodiments described above, the location where the robot according to the embodiment of the invention is installed is not limited to a floor surface and may instead, for example, be a ceiling surface or a sidewall surface. Further, the robot according to the embodiment of the invention is not limited to a robot fixed to and installed in a building or any other structural object and may, for example, be a leg walking (traveling) robot having legs.

In the embodiments described above, a horizontal multi-articulated robot has been described as an example of the robot according to the embodiment of the invention, and the robot according to the embodiment of the invention may instead be a robot of a different type, such as a vertical multi-articulated robot, as long as the robot has two members that pivot relative to each other.

The power transmitting apparatus according to any of the embodiments of the invention is not necessarily used in the printer described above and can be used in an industrial printer, a consumer printer, and a variety of other types of printer each having a rotating portion. In the case where the power transmitting apparatus according to any of the embodiments of the invention is used in a printer, the location where the power transmitting apparatus is installed is not limited to the location described above, and the power transmitting apparatus may, for example, be used in a sheet feeding mechanism.

The above embodiments have been described with reference to the case where the power transmitting section provided in the power transmitting apparatus is a decelerator. The power transmitting section may instead be any apparatus or component that transmits drive force from an input shaft section to an output shaft section, such as a gear apparatus including no deceleration mechanism and a shaft including no gear mechanism but having an input shaft section and an output shaft section at opposite end portions.

The entire disclosure of Japanese Patent Application No. 2016-147732, filed Jul. 27, 2016 is expressly incorporated by reference herein.

What is claimed is:

1. A power transmitting apparatus comprising:
a power transmitting section that includes an input shaft section and an output shaft section and transmits drive force from the input shaft section to the output shaft section;
a first detection section including a polarizing section that rotates when one of the input shaft section and the output shaft section rotates and has a polarization characteristic, a light source section that irradiates the polarizing section with light, and a light detection section that outputs a signal according to intensity of the light from the polarizing section;
a second detection section that outputs a signal according to a rotational state of another one of the input shaft section and the output shaft section; and
a determination section that determines a rotational state of the polarizing section based on the signal from the light detection section and the signal from the second detection section.

2. The power transmitting apparatus according to claim 1, wherein the power transmitting section is a gear apparatus that decelerates drive force inputted to the input shaft section and outputs the decelerated drive force to the output shaft section,
the polarizing section rotates when the output shaft section rotates,
the second detection section outputs a signal according to the rotational state of the input shaft section, and
the determination section uses a quotient of $2r/\alpha$ to distinguish rotational states of the polarizing section that differ from each other by 180° from each other, where $\alpha$ represents a speed transmission ratio of a speed of the input shaft section of the gear apparatus to a speed of the output shaft section thereof, and r represents a number of revolutions of the input shaft section.

3. The power transmitting apparatus according to claim 2, wherein the determination section uses both the quotient and a remainder of $2r/\alpha$ to distinguish the rotational states of the polarizing section that differ from each other by 180° from each other.

4. The power transmitting apparatus according to claim 2, wherein the second detection section is a counter that detects the number of revolutions of the input shaft section.

5. The power transmitting apparatus according to claim 4, wherein the counter is a multiple rotation detecting encoder.

6. The power transmitting apparatus according to claim 5, further comprising a motor connected to the input shaft section,
wherein the multiple rotation detecting encoder is disposed on the motor.

7. A robot comprising the power transmitting apparatus according to claim 1.

8. The robot according to claim 7, further comprising an arm having a surface on which the polarizing section is provided.

9. A printer comprising the power transmitting apparatus according to claim 1.

* * * * *